(12) United States Patent
Tang et al.

(10) Patent No.: US 11,805,462 B2
(45) Date of Patent: Oct. 31, 2023

(54) INFORMATION ACQUISITION METHOD AND SENDING METHOD, AND TERMINAL AND FIRST NETWORK DEVICE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Xiaoxuan Tang, Beijing (CN); Min Xu, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 303 days.

(21) Appl. No.: 17/287,737

(22) PCT Filed: Sep. 29, 2019

(86) PCT No.: PCT/CN2019/108884
§ 371 (c)(1),
(2) Date: Apr. 22, 2021

(87) PCT Pub. No.: WO2020/082994
PCT Pub. Date: Apr. 30, 2020

(65) Prior Publication Data
US 2021/0400557 A1    Dec. 23, 2021

(30) Foreign Application Priority Data
Oct. 22, 2018    (CN) .......................... 201811228239.9

(51) Int. Cl.
*H04W 36/32* (2009.01)
*H04W 4/02* (2018.01)

(52) U.S. Cl.
CPC ........... *H04W 36/32* (2013.01); *H04W 4/027* (2013.01)

(58) Field of Classification Search
CPC ..... H04W 36/32; H04W 4/027; H04W 48/20; H04W 64/006
(Continued)

(56) References Cited

U.S. PATENT DOCUMENTS 5,880,693 A     3/1999  Drummer
2006/0258386 A1* 11/2006  Jeong ................... H04W 36/24
                                                        455/525
(Continued)

FOREIGN PATENT DOCUMENTS

CN      1164950 A    11/1997
CN      1233379 A    10/1999
(Continued)

OTHER PUBLICATIONS

International Search Report in the international application No. PCT/CN2019/108884, dated Dec. 27, 2019, 2 pgs.
(Continued)

*Primary Examiner* — Michael Y Mapa
(74) *Attorney, Agent, or Firm* — Cooper Legal Group, LLC (57) ABSTRACT

An information acquisition method includes: receiving cell moving speed information sent by a first network device, wherein the cell moving speed information comprises cell moving speed information of the first network device, and/or cell moving speed information of a second network device adjacent to the first network device.

13 Claims, 2 Drawing Sheets

Receive movement information of a cell transmitted by a first network device — 101

(58) Field of Classification Search
USPC .................................. 370/331; 455/436–445
See application file for complete search history.

(56) References Cited

U.S. PATENT DOCUMENTS

| | | | |
|---|---|---|---|
| 2009/0275334 A1 | 11/2009 | Xie | |
| 2012/0088509 A1 | 4/2012 | Yi | |
| 2016/0057697 A1* | 2/2016 | Sirotkin | ................ H04W 48/14 |
| | | | 370/331 |
| 2016/0302143 A1* | 10/2016 | Karlsson | ................ H04W 4/40 |
| 2017/0127332 A1 | 5/2017 | Axmon et al. | |
| 2018/0294870 A1 | 10/2018 | Van Wynsberghe | |
| 2018/0332522 A1 | 11/2018 | Axmon et al. | |
| 2019/0326981 A1 | 10/2019 | Wang et al. | |

FOREIGN PATENT DOCUMENTS

| | | |
|---|---|---|
| CN | 1281077 C | 10/2006 |
| CN | 101442786 A | 5/2009 |
| CN | 102098708 A | 6/2011 |
| CN | 102238569 A | 11/2011 |
| CN | 102263600 A | 11/2011 |
| CN | 102958093 A | 3/2013 |
| CN | 102983956 A | 3/2013 |
| CN | 103052102 A | 4/2013 |
| CN | 103209450 A | 7/2013 |
| CN | 103765957 A | 4/2014 |
| CN | 105993195 A | 10/2016 |
| CN | 106575992 A | 4/2017 |
| CN | 106576296 A | 4/2017 |
| CN | 107800461 A | 3/2018 |
| CN | 108243391 A | 7/2018 |
| CN | 108271118 A | 7/2018 |
| CN | 108349581 A | 7/2018 |
| CN | 108476057 A | 8/2018 |
| WO | 2016155477 A1 | 10/2016 |

OTHER PUBLICATIONS

English translation of the Written Opinion of the International Search Authority in the international application No. PCT/CN2019/108884, dated Dec. 27, 2019, 4 pgs.

* cited by examiner

Receive movement information of a cell transmitted by a first network device — 101

FIG. 1

Transmit movement information of a cell to a terminal — 201

INFORMATION ACQUISITION METHOD AND SENDING METHOD, AND TERMINAL AND FIRST NETWORK DEVICE

CROSS-REFERENCE TO RELATED APPLICATION

This application claims the priority of Chinese Patent Application No. 201811228239.9 filed in China on Oct. 22, 2018, which is incorporated herein by reference in its entirety.

TECHNICAL FIELD

The present disclosure relates to the field of communications, and more particularly, to a method for information acquisition, a transmission method, a terminal, and a first network device.

BACKGROUND

In Non-Terrestrial Networks (NTN), different from terrestrial cellular networks in related technologies network device (e.g. base station) are deployed on a high altitude flight platform (balloon, drone, etc.) or a satellite. The network devices in the NTN usually operate in altitudes above 8 km, and have the advantages of wide coverage, line-of-sight propagation, unaffected by a ground disaster, and so on. As an effective complement to terrestrial cellular networks in related technologies, the NTN may meet the network coverage requirements of remote areas or geographically quarantine areas (e.g., islands, civil aviation aircraft, ocean-going ships) and improve the reliability of communication networks, particularly in case of sudden disasters.

In terrestrial networks, since the location of base station and the serving cell are relatively fixed (stationary with respect to the ground), the velocity of the terminal with respect to the serving cell is equal to the ground velocity of the terminal; in NTN, the serving cell may be stationary (such as a serving cell provided by a hovering balloon, a drone, or a synchronous orbit satellite) or mobile with respect to the ground. When the serving cell moves with respect to the ground, the velocity of the terminal with respect to the serving cell are not equal to the ground velocity of the terminal, and mechanisms such as Mobility State Estimation (MSE) and Doppler frequency shift estimation in the related technologies are not fully applicable.

However, for scenarios where the cell is moving with respect to the ground, there is no relevant method currently for the terminal to obtain the motion information of the cell, thereby affecting the communication behavior associated with the motion state of the cell.

SUMMARY

An embodiment of the present disclosure provides a method for information acquisition, a method for information transmission, a terminal, and a first network device, to solve a problem that there is no relevant existing method for the terminal to learn the motion information of a cell.

According to a first aspect, an embodiment of the present disclosure provides a method for information acquisition applied to a terminal. The method includes receiving movement information of a cell transmitted by a first network device. The movement information of the cell comprises velocity and movement direction information of a cell of the first network device and/or velocity and movement direction information of a cell of a second network device adjacent to the first network device.

According to a second aspect, an embodiment of the present disclosure further provides a method for information transmission applied to a first network device. The method includes transmitting movement information of a cell to a terminal. The movement information of the cell comprises velocity and movement direction information of a cell of the first network device and/or velocity and movement direction information of a cell of a second network device adjacent to the first network device.

According to a third aspect, an embodiment of the present disclosure further provides a terminal, including a receiver. The receiver is configured to receive movement information of a cell transmitted by a first network device; and the movement information of the cell comprises velocity and movement direction information of a cell of the first network device and/or velocity and movement direction information of a cell of a second network device adjacent to the first network device.

According to a fourth aspect, an embodiment of the present disclosure further provides a first network device, including: a transmitter. The transmitter is configured to transmit movement information of a cell to a terminal. The movement information of the cell comprises velocity and movement direction information of a cell of the first network device and/or velocity and movement direction information of a cell of a second network device adjacent to the first network device.

According to a fifth aspect, an embodiment of the present disclosure further provides a terminal including a memory, a processor, and a computer program stored on the memory and executable by the processor. The computer program, when executed by the processor, implements the steps of the above-mentioned method for information acquisition.

According to a sixth aspect, an embodiment of the present disclosure further provides a first network device including a memory, a processor, and a computer program stored on the memory and executable on the processor. The computer program, when executed by the processor, implements the steps of the above-mentioned method for information transmission.

According to a seventh aspect, an embodiment of the present disclosure further provides a computer-readable storage medium having stored a computer program, wherein the computer program, when executed by a processor, implements the steps of the above-mentioned information acquiring method or the above-mentioned method for information transmission.

With the method for information acquisition according to the embodiment of the present disclosure, the terminal may learn, by receiving the movement information of the cell transmitted by the first network device, the motion information of the relevant cell, such that when the communication behavior associated with the motion state of the cell is performed, particularly in a scenario in which the cell moves with respect to the ground, the corresponding communication behavior can be performed effectively.

BRIEF DESCRIPTION OF THE DRAWINGS

In order to describe the technical solutions of the embodiments of the present disclosure clearly, references are made to the accompanying drawings used in the embodiments of the present disclosure. It is apparent that the accompanying drawings in the following description are merely some of the embodiments of the present disclosure, and other drawings may be obtained by those skilled in the art without involving any inventive effort.

DETAILED DESCRIPTION

The technical solutions of the embodiments of the present disclosure are described clearly and completely below in connection with the accompanying drawings, and it is apparent that the described embodiments are a part, but not all, of the embodiments of the present disclosure. Based on the embodiments in the present disclosure, all other embodiments obtained by those skilled in the art without involving any inventive effort are within the scope of protection of the present disclosure.

First, it is to be noted that the embodiment of the present disclosure may be mainly directed to a scenario in which a cell in the NTN moves with respect to the ground, and the terminal may learn, by receiving the movement information of the cell transmitted by the network side, the motion information of the relevant cell, such that when the communication behavior associated with the motion state of the cell is performed, the corresponding communication behavior can be performed effectively. The cell may be a serving cell and/or a candidate cell.

Figure 1:
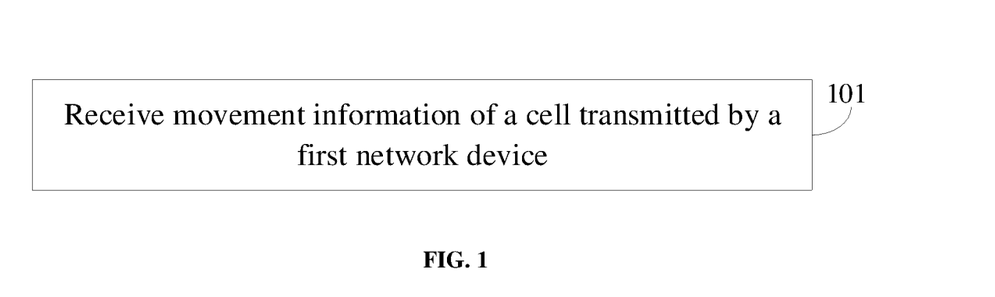
FIG. 1 is a flowchart of a method for information acquisition according to an embodiment of the present disclosure.

Referring to FIG. 1, an embodiment of the present disclosure provides a method for information acquisition applied to a terminal. The method includes Step 101.

At Step 101, movement information of a cell transmitted by a first network device is received.

Herein, the movement information of the cell includes velocity and movement direction information of a cell of the first network device and/or velocity and movement direction information of a cell of a second network device adjacent to the first network device.

It is to be understood that the first network device and the second network device may be, for example, a base station. The number of the second network devices may be one or more. The movement information of the cell of the first network device may include velocity and movement direction information of a serving cell of the first network device and/or velocity and movement direction information of at least one candidate cell of the first network device. Further, the movement information of the serving cell and the movement information of the candidate cell may be the same or may be different. When the movement information of a plurality of candidate cells is included, the movement information of every two candidate cells of the plurality of candidate cells may be the same or may be different. The movement information of the cell of the second network device may include movement information of at least one candidate cell of the second network device. When the movement information of a plurality of candidate cells is included, the movement information of every two candidate cells of the plurality of candidate cells may be the same or may be different.

With the method for information acquisition according to the embodiment of the present disclosure, the terminal may learn, by receiving the movement information of the cell transmitted by the first network device, the motion information of the relevant cell, such that when the communication behavior associated with the motion state of the cell is performed, particularly in a scenario in which the cell moves with respect to the ground, the corresponding communication behavior can be performed effectively.

In an embodiment of the present disclosure, optionally, the above-described Step 101 may include one of the following operations.

The terminal receives the movement information of the cell broadcast by a first network device through system information.

Alternatively, the terminal receives the movement information of the cell transmitted by the first network device through dedicated signaling.

The above-mentioned dedicated signaling may be determined based on actual conditions, and are not limited in the embodiments of the present disclosure. In this way, the terminal obtains the movement information of the cell by means of system information or dedicated signaling.

Optionally, the movement information of the cell may include at least one of a velocity value of the cell with respect to the ground, or a velocity direction of the cell with respect to the ground.

Herein, the unit of the velocity value of the cell with respect to the ground may be at least one of a geographical unit (such as kilometer/hour, mile/hour or meter/second), and an equivalent unit (such as the number of ordinary cells in the terrestrial network equivalent to the displacement per hour, i.e. the number of ordinary cells in the terrestrial network equivalent to the displacement per unit time of the cell with respect to the ground).

In the embodiment of the present disclosure, optionally, after Step 101, the method may further include that the terminal performs communication behavior associated with a motion state of the cell according to the movement information of the cell.

Herein, the communication behavior associated with the motion state of the cell includes but is not limited to a motion state estimation (cell reselection), Doppler frequency shift estimation, and the like. In this way, the communication behavior associated with the motion state of the cell is performed according to the movement information of the cell, and the influence of the cell movement on the related communication behavior may be counteracted.

As is well known in the art, in a mobile cellular network in the related art, an MSE is used for a terminal to estimate a motion state of the terminal and to perform a cell reselection using a pre-configured Scaling Factor associated with the motion state. The MSE in the related art is realized by counting the number of times the terminal performs cell reselection within a preset time (the more the number of times, the higher the motion state), i.e., it is determined that the MSE is in a corresponding motion state (normal, medium, high) on the basis that the number N of times the terminal performs cell reselection within a preset time TCRmax is within a certain predetermined range ($0$~$N_{CR\_M}$, $N_{CR\_M}$~$N_{CR\_H}$, $N_{CR\_H}$~$\infty$). The premise for an effective MSE mechanism in the related art is that the position of the cell with respect to the ground is stationary, i.e., the velocity of the terminal with respect to the cell is equal to the ground velocity of the terminal, without taking into account the factor of cell movement. However, in a scenario in which the cell moves with respect to the ground, since the influence of the movement velocity of the cell, i.e., the neighboring cell, is not taken into account, the number of times for the cell reselection counted by the terminal may decrease when the decomposition vector of the moving direction of the cell is the same as the moving direction of the terminal, causing the estimated motion state to be too low; in contrast, the number of times for the cell reselection counted by the terminal may increase when the decomposition vector of the moving direction of the cell is opposite to the moving direction of the terminal, or when the terminal is stationary, causing the estimated motion state to be too high. A too low or too high estimated motion state causes the terminal to perform cell reselection using an erroneous scaling factor, or to obtain an erroneous priority when reselecting a cell with a velocity priority, such as a high-speed rail network.

To counteract the adverse impact of cell movement on the reselection process, in the embodiment of the present disclosure, the motion state of the terminal may be determined and the cell reselection may be performed based on the received movement information of the cell.

Specifically, the above-mentioned process of performing a communication behavior associated with a motion state of the cell according to the movement information of the cell may include the following operations.

The number of ordinary cells in a terrestrial network equivalent to a movement displacement of each cell reselected by the terminal in a moving direction of the terminal within a preset time is estimated based on the movement information of the cell.

The number of cell reselections for the terminal during a preset time is adjusted according to an estimated number of ordinary cells in the terrestrial network.

A motion state of the terminal is determined using the adjusted number of cell reselections for the terminal.

Cell reselection is performed according to a scaling factor associated with the motion state of the terminal.

For example, if the preset time is $T_{CRmax}$, and the number of times the terminal performs cell reselection in $T_{CRmax}$ is n, the adjusted number N of times the terminal performs cell reselection is $N=n+\Sigma k_i$; where i=1, 2 . . . n, and $k_i$ denotes the number of ordinary cells in the terrestrial network equivalent to a movement displacement of the i-th reselected cell in a moving direction of the terminal.

Herein, when estimating the number of ordinary cells in a terrestrial network equivalent to a movement displacement, the number may be determined by dividing the movement displacement by the preset diagonal length of the cell. In order to accurately determine the motion state of the terminal, the number of ordinary cells in a terrestrial network equivalent to a movement displacement may be a positive number or a negative number (depending on the corresponding movement displacement), or may be an integer or a non-integer. For example, if the movement displacement is 5 km and the preset diagonal length of the cell is 2 km, the number of ordinary cells in a terrestrial network equivalent to a movement displacement is 2.5; or, if the movement displacement is 6 km and the preset diagonal length of the cell is 2 km, the number of ordinary cells in a terrestrial network equivalent to a movement displacement is 3; or, if the movement displacement is −5.6 km and the preset diagonal length of the cell is 2 km, the number of ordinary cells in a terrestrial network equivalent to a movement displacement is −2.8.

In this way, the cell reselection performed according to the received movement information of the cell may counteract the adverse impact of cell movement on the reselection process, reduce the unnecessary reselection, such as a reselection in which a neighboring cell shortly passes through the path of the terminal or the location of the terminal, and ensure a effectively performed cell reselection.

Generally, the Doppler frequency shift estimation in the related art may be calculated according to the following equation:

$$f_d = \frac{f}{c} \times v \times \cos\theta.$$

Herein θ is the angle between the moving direction of the terminal and the direction of an incident wave, and v is the ground velocity of the terminal; c is the electromagnetic wave propagation velocity $3\times10^5$ Km/s, and f is the carrier frequency.

That is to say, merely the ground velocity of the terminal is considered in the Doppler frequency shift estimation in the related art, and a premise of an effective Doppler frequency shift estimation is that the position of the cell with respect to the ground is stationary, i.e., the velocity of the terminal with respect to the cell is equal to the ground velocity of the terminal, without considering the factor of cell movement. However, in the scenario where the cell moves with respect to the ground, the Doppler frequency shift estimated by the terminal may be too large when the decomposition vector of the moving direction of the cell is the same as the moving direction of the terminal, because the velocity of the terminal with respect to the cell is lower than the ground velocity of the terminal; in contrast, the Doppler frequency shift estimated by the terminal may be too small when the decomposition vector of the moving direction of the cell is opposite to the moving direction of the terminal, or when the terminal is stationary, because the velocity of the terminal with respect to the cell is higher than the ground velocity of the terminal. A too large or too small estimated Doppler frequency shift causes a large error in the Doppler frequency shift estimation of the terminal, thereby reducing the reception quality.

To counteract the adverse effects of a cell movement on the Doppler frequency shift estimation process, in the embodiment of the present disclosure, a Doppler frequency shift estimation may be performed based on received movement information of the cell.

Specifically, the process of performing a communication behavior associated with a motion state of the cell according to the movement information of the cell may include:

estimating, according to the movement information of the cell, a decomposition vector velocity value of the cell accessed by the terminal in a moving direction of the terminal;

adjusting a ground velocity of the terminal according to the estimated decomposition vector velocity value; and performing a Doppler frequency shift estimation using the adjusted ground velocity of the terminal.

For example, if the ground velocity of the terminal is $V_{UE}$, the decomposition vector velocity of the cell accessed by the terminal in the moving direction of the terminal is $V_{NTNCELL}$, wherein $V_{NTNCELL}$ may be positive or negative, the adjusted ground velocity V of the terminal is $V=V_{UE}+V_{NTNCELL}$. V may be equivalent to the velocity of the terminal with respect to the electromagnetic wave.

In this way, the Doppler frequency shift estimation performed according to the received movement information of the cell may counteract the adverse effects of the cell movement on the Doppler frequency shift estimation process, thereby reducing the error and enabling the terminal to select an appropriate carrier for data reception.

Figure 2:
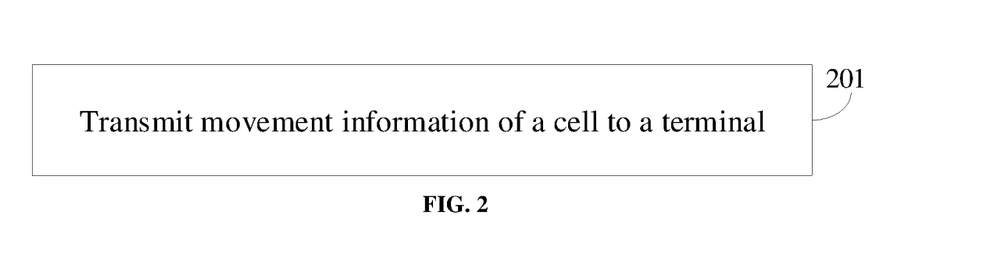
FIG. 2 is a flowchart of a method for information transmission according to an embodiment of the present disclosure.

Referring to FIG. 2, an embodiment of the present disclosure provides an method for information transmission applied to a first network device. The method includes Step 201.

At Step 201, movement information of a cell is transmitted to a terminal.

Herein, the movement information of the cell comprises velocity and movement direction information of a cell of the first network device and/or velocity and movement direction information of a cell of a second network device adjacent to the first network device.

With the method for information transmission according to the embodiment of the present disclosure, the terminal may learn, by transmitting the movement information of the cell to the terminal, the motion information of the relevant cell, such that when the communication behavior associated with the motion state of the cell is performed, especially in a scenario in which the cell moves with respect to the ground, the corresponding communication behavior can be performed effectively.

In an embodiment of the present disclosure, optionally, Step 201 may include broadcasting the movement information of the cell to the terminal through system information; or, transmitting the movement information of the cell to the terminal through dedicated signaling.

The method for information acquisition and the transmission method are described in the above-mentioned embodiments of the present disclosure, and the terminal and the first network device of the present disclosure will be described with reference to the embodiments and the accompanying drawings.

Figure 3:
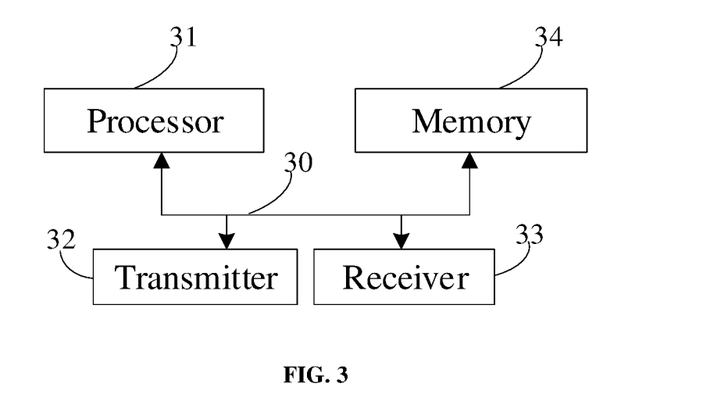
FIG. 3 is a schematic structural diagram of a terminal according to an embodiment of the present disclosure.

Referring to FIG. 3, an embodiment of the present disclosure further provides a terminal including a processor 31, a transmitter 32, and a receiver 33.

Herein, the receiver 33 is configured to receive movement information of a cell transmitted by a first network device. The movement information of the cell includes velocity and movement direction information of a cell of the first network device and/or velocity and movement direction information of a cell of a second network device adjacent to the first network device.

With the terminal according to the embodiment of the present disclosure, by receiving the movement information of the cell transmitted by the first network device, the motion state of a relevant cell may be known, such that when the communication behavior associated with the motion state of the cell is performed, especially in a scenario in which the cell moves with respect to the ground, the corresponding communication behavior can be performed effectively.

In the disclosed embodiment, optionally, the receiver 33 is specifically configured to receive the movement information of the cell broadcast by the first network device through system information, or receive the movement information of the cell transmitted by the first network equipment through dedicated signaling.

Optionally, the movement information of the cell includes at least one of a velocity value of the cell with respect to the ground, or a velocity direction of the cell with respect to the ground.

Optionally, the processor 31 is configured to perform a communication behavior associated with a motion state of the cell according to the movement information of the cell.

Optionally, the processor 31 is further configured to estimate, based on the movement information of the cell, the number of ordinary cells in a terrestrial network equivalent to a movement displacement of each cell reselected by the terminal in a moving direction of the terminal within a preset time; adjust a number of times the terminal performs cell reselection within the preset time according to the estimated number of ordinary cells in the terrestrial network; determine a motion state of the terminal using the adjusted number of times the terminal performs cell reselection; and perform cell reselection according to a scaling factor associated with the motion state of the terminal.

Optionally, the processor 31 is further configured to estimate, according to the movement information of the cell, a decomposition vector velocity value of the cell accessed by the terminal in a moving direction of the terminal; adjust a ground velocity of the terminal according to an estimated decomposition vector velocity value; and perform a Doppler frequency shift estimation using an adjusted ground velocity of the terminal.

In FIG. 3, a bus architecture (represented by bus 30), which may include any number of interconnected buses and bridges, connects together various circuits including one or more processors represented by a processor 31 and memory represented by a memory 34. The transmitter 32 and receiver 33 may be one transceiver interface, and the transmitter 32 and receiver 33 may be connected to the processor 31 and memory 34 via bus 30.

The processor 31 is responsible for managing the bus 30 and general processing, and the memory 34 may be used to store data used by the processor 31 in performing operations.

Figure 4:
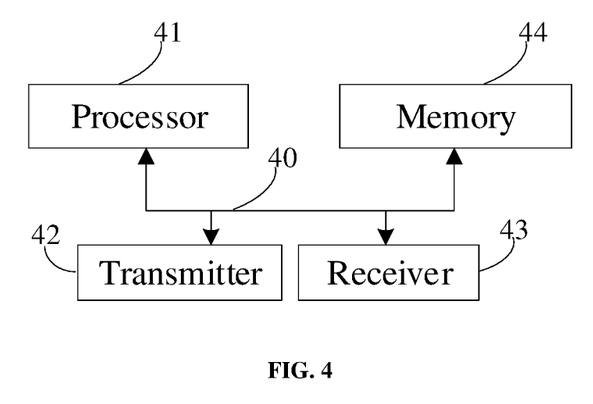
FIG. 4 is a schematic structural diagram of a first network device according to an embodiment of the present disclosure.

Referring to FIG. 4, an embodiment of the present disclosure further provides a first network device including a processor 41, a transmitter 42, and a receiver 43.

Herein, the transmitter 42 is configured to transmit movement information of a cell to a terminal. The movement information of the cell comprises velocity and movement direction information of a cell of the first network device and/or velocity and movement direction information of a cell of a second network device adjacent to the first network device.

With the first network device according to the embodiment of the present disclosure, the terminal may learn, by receiving the movement information of the cell transmitted by the first network device, the motion information of the relevant cell, such that when the communication behavior associated with the motion state of the cell is performed, particularly in a scenario in which the cell moves with respect to the ground, the corresponding communication behavior can be performed effectively.

Optionally, the transmitter 42 is specifically configured to broadcast the movement information of the cell to the terminal through system information; or, transmit the movement information of the cell to the terminal through dedicated signaling.

In FIG. 4, a bus architecture (represented by bus 40), which may include any number of interconnected buses and bridges, connects together various circuits including one or more processors represented by a processor 41 and a memory represented by a memory 44. The transmitter 42 and receiver 43 may be one transceiver interface, and the transmitter 42 and receiver 43 may be connected to the processor 41 and memory 44 via bus 40.

The processor 41 is responsible for managing the bus 40 and general processing, and the memory 44 may be used to store data used by the processor 41 in performing operations.

In addition, an embodiment of the present disclosure further provides a terminal including a memory, a processor, and a computer program stored on the memory and executable on the processor, wherein the computer program, when executed by the processor, implements the processes of the above-described method for information acquisition and achieves the same technical effect. To avoid repetition, details are not described herein.

An embodiment of the present disclosure further provides a first network device including a memory, a processor, and a computer program stored on the memory and executable on the processor, wherein the computer program, when executed by the processor, implements the processes of the above-described method for information transmission and achieves the same technical effect. To avoid repetition, details are not described herein.

Figure 5:
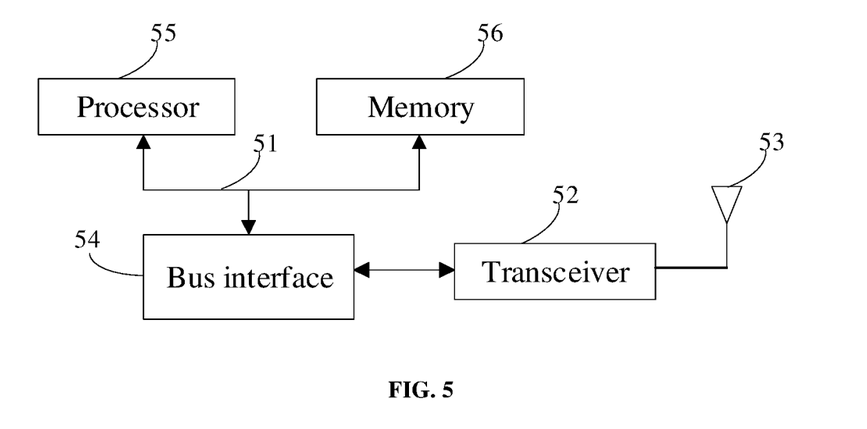
FIG. 5 is a schematic structural diagram of a communication device according to an embodiment of the present disclosure.

Specifically, referring to FIG. 5, an embodiment of the present disclosure further provides a communication device including bus 51, a transceiver 52, an antenna 53, a bus interface 54, a processor 55, and a memory 56.

In an embodiment of the present disclosure, the communication device further includes a computer program stored on the memory 56 and operable on the processor 55.

Optionally, when the communication device is a terminal, the computer program, when executed by the processor 55, may perform the following steps: receiving movement information of a cell transmitted by a first network device. The movement information of the cell includes velocity and movement direction information of a cell of the first network device and/or velocity and movement direction information of a cell of a second network device adjacent to the first network device.

Optionally, when the communication device is a first network device, the computer program, when executed by the processor 55, may perform the following steps: transmitting movement information of a cell to a terminal. The movement information of the cell includes velocity and movement direction information of a cell of the first network device and/or velocity and movement direction information of a cell of a second network device adjacent to the first network device.

In FIG. 5, a bus architecture (represented by bus 51), which may include any number of interconnected buses and bridges, connects together various circuits including one or more processors represented by a processor 55 and a memory represented by a memory 56. The bus 51 may also connect various other circuits, such as peripherals, voltage regulators, and power management circuits, all of which are well known in the art and therefore will not be described further herein. A bus interface 54 provides an interface between bus 51 and transceiver 52. The transceiver 52 may be an element or may be a plurality of elements, such as a plurality of receivers and transmitters, providing units for communicating with various other devices on the transmission medium. The data processed by the processor 55 is transmitted over the wireless medium via an antenna 53, which further receives the data and transmits the data to the processor 55.

The processor 55 is responsible for managing the bus 51 and general processing, and may further provide various functions, including timing, peripheral interfaces, voltage regulation, power management, and other control functions. The memory 56 may be used to store data used by the processor 55 in performing operations.

Optionally, the processor 55 may be a central processing unit CPU, an application specific integrated circuit ASIC, a field programmable gate array FPGA, or a complex programmable logic device CPLD.

The embodiment of the present disclosure further provides a computer-readable storage medium having stored thereon a computer program, which, when executed by a processor, may implement the processes of the above-described method for information acquisition or the processes of the above-described method for information transmission, and may achieve the same technical effect. To avoid repetition, details are not described herein.

The computer-readable medium includes both permanent and non-permanent mediums, removable and non-removable mediums, and implements information storage by any method or technique. The information may be computer-readable instructions, data structures, modules of a program, or other data. Examples of storage medium for a computer include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, read-only optical disk (CD-ROM), digital versatile disks (DVD) or other optical storage, magnetic cassette tape, magnetic tape magnetic disk storage or other magnetic storage device, or any other non-transmission medium that may be used to store information that may be accessed by a computing device. As defined herein, a computer-readable medium does not include a transitory media, such as a modulated data signal and a carrier wave.

It is to be noted that, in this disclosure, the terms "comprises," "comprising," or any other variation thereof, are intended to cover a non-exclusive inclusion, such that a process, method, article, or apparatus that comprises a list of elements includes not only those elements but also other elements not expressly listed, or further includes elements inherent to such a process, method, article, or apparatus. Without more limitations, an element defined by the statement "include a . . . " does not rule out additional identical elements in the process, method, article, or apparatus that includes the element.

The above-described serial numbers of the disclosed embodiments are merely for the purpose of description and do not represent the advantages or disadvantages of the embodiments.

From the above description of the embodiments, it will be apparent to those skilled in the art that the method of the above embodiments may be implemented by means of software plus the necessary general hardware platform, or may be implemented by means of hardware, but the former is the preferred embodiment in many cases. Based on such an understanding, the essential technical solution of the present disclosure or the part that contributes to the prior art may be embodied in the form of a software product stored in a storage medium (such as a ROM/RAM, a magnetic disk, or an optical disk), including instructions for causing a terminal (which may be a mobile phone, a computer, a server, an air conditioner, or a network device) to perform the methods described in the embodiments of the present disclosure.

It is to be understood that the embodiments described in the present disclosure may be implemented in hardware, software, firmware, middleware, microcode, or combinations thereof. For a hardware implementation, the processing units may be implemented in one or more Application Specific Integrated Circuits (ASIC), Digital Signal Processing (DSP), DSP Device (DSPD), Programmable Logic Device (PLD), Field-Programmable Gate Array (FPGA), general purpose processors, controllers, microcontrollers, microprocessors, other electronic units for performing the functions described in the present disclosure, or combinations thereof.

For a software implementation, the techniques described in the embodiments of the present disclosure may be implemented by modules (e.g., processes, functions, etc.) that perform the functions described in the embodiments of the present disclosure. The software code may be stored in a memory and executed by a processor. The memory may be implemented in the processor or external to the processor.

The foregoing are merely optional embodiments of the present disclosure. It is to be noted that several modifications and embellishments may be made by those skilled in the art without departing from the principles of the present disclosure, and such modifications and embellishments are also considered to be within the scope of protection of the present disclosure.

The invention claimed is:

1. A method for information acquisition, applied to a terminal, comprising:
receiving movement information of a cell transmitted by a first network device;
wherein the movement information of the cell comprises at least one of:
velocity and movement direction information of a cell of the first network device, or
velocity and movement direction information of a cell of a second network device neighbouring the first network device;
wherein after receiving the movement information of the cell transmitted by the first network device, the method further comprises:
performing a communication behavior associated with a motion state of the cell according to the movement information of the cell;
wherein performing the communication behavior associated with the motion state of the cell according to the movement information of the cell comprises:
counting, based on the movement information of the cell, for each cell reselected by the terminal in a moving direction of the terminal within a preset time, a number of cell reselections for the cell as an equivalent number of first cells in a terrestrial network configured for the cell;
adjusting the number of cell reselections for the terminal during the preset time according to the counted number of first cells in the terrestrial network;
determining a mobility state of the terminal using the adjusted number of cell reselections for the terminal; and
performing cell reselection according to a scaling factor associated with the mobility state of the terminal.

2. The method of claim 1, wherein receiving the movement information of the cell transmitted by the first network device comprises:
receiving the movement information of the cell broadcast by the first network device through system information; or
receiving the movement information of the cell transmitted by the first network device through dedicated signaling.

3. The method of claim 1, wherein the movement information of the cell comprises at least one of:

a velocity value of the cell with respect to ground, or
a velocity direction of the cell with respect to the ground.

4. The method of claim 1, wherein performing the communication behavior associated with the motion state of the cell according to the movement information of the cell comprises:
estimating, according to the movement information of the cell, a decomposition vector velocity value of the cell accessed by the terminal in the moving direction of the terminal;
adjusting a ground velocity of the terminal according to the estimated decomposition vector velocity value; and
performing a Doppler frequency shift estimation using the adjusted ground velocity of the terminal.

5. The terminal, comprising a memory, a processor, and a computer program stored on the memory and executable by the processor, wherein the computer program, when executed by the processor, implements the steps of the method for information acquisition according to claim 1.

6. A non-transitory computer-readable storage medium having stored a computer program, wherein the computer program, when executed by a processor, implements the steps of the method for information acquisition according to claim 1.

7. A method for information transmission, comprising:
transmitting, by a first network device, movement information of a cell to a terminal;
wherein the movement information of the cell comprises at least one of:
velocity and movement direction information of a cell of the first network device, or
velocity and movement direction information of a cell of a second network device neighbouring the first network device;
wherein the movement information of the cell enables the terminal to perform a communication behavior associated with a motion state of the cell, comprising:
counting, based on the movement information of the cell, for each cell reselected by the terminal in a moving direction of the terminal within a preset time, a number of cell reselections for the cell as an equivalent number of first cells in a terrestrial network configured for the cell;
adjusting the number of cell reselections for the terminal during the preset time according to the counted number of first cells in the terrestrial network;
determining a mobility state of the terminal using the adjusted number of cell reselections for the terminal; and
performing cell reselection according to a scaling factor associated with the mobility state of the terminal.

8. The method of claim 7, wherein transmitting the movement information of the cell to the terminal comprises:
broadcasting the movement information of the cell to the terminal through system information; or
transmitting the movement information of the cell to the terminal through dedicated signaling.

9. A non-transitory computer-readable storage medium having stored a computer program, wherein the computer program, when executed by a processor, implements the steps of the method for information acquisition according to claim 7.

10. A terminal, comprising:
a receiver; and
a processor wherein the receiver is configured to receive movement information of a cell transmitted by a first network device;

wherein the movement information of the cell comprises at least one of:
  velocity and movement direction information of a cell of the first network device, or
  velocity and movement direction information of a cell of a second network device neighbouring the first network device;

wherein the processor is configured to perform a communication behavior associated with a motion state of the cell according to the movement information of the cell;

wherein the processor is further configured to:
  count, based on the movement information of the cell, for each cell reselected by the terminal in a moving direction of the terminal within a preset time, a number of cell reselections for the cell as an equivalent number of first cells in a terrestrial network configured for the cell;
  adjust the number of cell reselections for the terminal during the preset time according to the counted number of first cells in the terrestrial network;
  determine a mobility state of the terminal using the adjusted number of cell reselections for the terminal; and
  perform cell reselection according to a scaling factor associated with the mobility state of the terminal.

11. The terminal according to claim 10, wherein the receiver is specifically configured to:
  receive the movement information of the cell broadcast by the first network device through system information; or
  receive the movement information of the cell transmitted by the first network device through dedicated signaling.

12. The terminal according to claim 10, wherein the movement information of the cell comprises at least one of:
  a velocity value of the cell with respect to ground, or
  a velocity direction of the cell with respect to the ground.

13. The terminal according to claim 10, wherein the processor is further configured to:
  estimate, according to the movement information of the cell, a decomposition vector velocity value of the cell accessed by the terminal in the moving direction of the terminal;
  adjust a ground velocity of the terminal according to the estimated decomposition vector velocity value; and
  perform a Doppler frequency shift estimation using the adjusted ground velocity of the terminal.

* * * * *